(12) United States Patent
Keskkula

(10) Patent No.: US 9,602,594 B2
(45) Date of Patent: Mar. 21, 2017

(54) PROCESSING REQUESTS

(75) Inventor: Silver Keskkula, Kuressaare (EE)

(73) Assignee: Microsoft Technology Licensing, LLC, Redmond, WA (US)

(*) Notice: Subject to any disclaimer, the term of this patent is extended or adjusted under 35 U.S.C. 154(b) by 271 days.

(21) Appl. No.: 13/562,692

(22) Filed: Jul. 31, 2012

(65) Prior Publication Data

US 2014/0040452 A1 Feb. 6, 2014

(51) Int. Cl.
*H04L 29/08* (2006.01)

(52) U.S. Cl.
CPC ...... *H04L 67/1029* (2013.01); *H04L 67/1034* (2013.01)

(58) Field of Classification Search
None
See application file for complete search history.

(56) References Cited

U.S. PATENT DOCUMENTS

| | | | |
|---|---|---|---|
| 6,694,471 B1* | 2/2004 | Sharp | H04L 1/1874 709/224 |
| 6,760,309 B1* | 7/2004 | Rochberger et al. | 370/235 |
| 7,149,774 B2* | 12/2006 | Zellner et al. | 709/203 |
| 7,231,657 B2* | 6/2007 | Honarvar et al. | 726/2 |
| 7,349,978 B2* | 3/2008 | Tan et al. | 709/237 |
| 7,444,536 B1 | 10/2008 | Jairath | |
| 2002/0054574 A1* | 5/2002 | Beach | H04L 12/5693 370/279 |
| 2002/0080719 A1 | 6/2002 | Parkvall et al. | |
| 2003/0060210 A1* | 3/2003 | Ravishankar | H04W 28/18 455/452.1 |
| 2003/0133457 A1* | 7/2003 | Ono | H04L 12/5693 370/395.4 |
| 2005/0159166 A1 | 7/2005 | Jonsson et al. | |
| 2006/0013128 A1* | 1/2006 | Connor | H04L 41/0896 370/229 |
| 2006/0187840 A1* | 8/2006 | Cuffaro | H04W 48/06 370/235 |
| 2006/0291395 A1* | 12/2006 | Ketonen | H04L 1/1685 370/236 |
| 2007/0115848 A1* | 5/2007 | Chean et al. | 370/252 |

(Continued)

FOREIGN PATENT DOCUMENTS

| CN | 101334291 | 12/2008 |
|---|---|---|
| CN | 101374158 | 2/2009 |

OTHER PUBLICATIONS

International Search Report & Written Opinion for PCT Patent Application No. PCT/US2013/052806, Mailed Date: Dec. 5, 2013, Filed Date: Jul. 31, 2013, 10 Pages.

(Continued)

*Primary Examiner* — Ninos Donabed
(74) *Attorney, Agent, or Firm* — Tom Wong; Micky Minhas

(57) ABSTRACT

Requests are processed at a computer server by receiving a request for service from a user terminal, the request including distress information representing a degree of failure to process at least one prior similar request from the user terminal for the service. The distress information is received from the request and the request is processed in accordance with the distress information. A user terminal provides distress information in a request, based on responses received from the server.

20 Claims, 3 Drawing Sheets

(56) References Cited

U.S. PATENT DOCUMENTS

| | | | |
|---|---|---|---|
| 2007/0133528 A1* | 6/2007 | Jin | H04B 7/18593 370/389 |
| 2007/0258395 A1* | 11/2007 | Jollota | A61B 5/14532 370/310 |
| 2007/0274215 A1* | 11/2007 | Gusat | H04L 1/1874 370/235 |
| 2008/0182604 A1* | 7/2008 | Kihara et al. | 455/466 |
| 2010/0002142 A1 | 1/2010 | Finn et al. | |
| 2010/0017530 A1* | 1/2010 | Gaur | H04L 12/56 709/231 |
| 2010/0030880 A1 | 2/2010 | Joshi et al. | |
| 2010/0058134 A1* | 3/2010 | Matsui | 714/748 |
| 2010/0271390 A1 | 10/2010 | Tran et al. | |
| 2010/0299433 A1 | 11/2010 | De Boer et al. | |
| 2010/0316066 A1 | 12/2010 | Leung | |
| 2011/0103262 A1* | 5/2011 | Guo et al. | 370/254 |
| 2011/0238670 A1 | 9/2011 | Mercuri | |
| 2012/0269054 A1* | 10/2012 | Fukushima et al. | 370/216 |

OTHER PUBLICATIONS

Fiedler, Markus, "Quality Feedback Flows in Future Networks", Retrieved at <<http://www.bth.se/fou/forskinfo.nsf/alfs/f65db0b6c873e7e8c12575fd006ade7a/$file/Quality%20Feedback%20Flows%20in%20Future%20Networks%20MFI.pdf>>, Proceedings: Journal of Elektrotechnik and Informationstechnik, vol. 126, Issue 7, Sep. 28, 2009, pp. 12.

"Foreign Office Action", CN Application No. 201380040729.5, Jan. 12, 2017, 10 pages.

* cited by examiner

PROCESSING REQUESTS

TECHNICAL FIELD

The present invention relates to processing requests, particularly in the context of a cloud-based stateless server architecture.

BACKGROUND

In such an architectures, multiple servers are provided for processing requests from multiple clients. The servers can be located in the same physical location, or in different physical locations, but as far as any particular client is concerned they are not aware of the location of the server. The servers are located behind a load balancing mechanism which manages requests to the servers from the client terminals, in accordance with a variety of load balancing techniques. The clients are in communication with the load balancing mechanism, and thus the servers, via any suitable network, which can be wired or wireless.

FIG. 1 illustrates an example architecture where the cloud is generally denoted to be shown to comprise multiple servers 4 located behind a load balancing mechanism 6. Client terminals 8 are in communication with the cloud 2 via network 10. The client terminals can be implemented as any form of computer terminal. For example, they can be laptops, tablets, mobile phones, personal computers etc. In each case, a client terminal 8 executes an application (e.g. an installed client) which allows the user of the terminal to access the cloud 2. The cloud 2 forms part of the Internet accessible by the application. When a service is required, a request to access the particular Internet location is sent from the client terminal 8 to the network 10 for accessing that location, for example using an Internet address in the form of a uniform resource locator URL. When the cloud 2 is accessed, the load balancing mechanism 6 receives a request and directs it to one of the servers 4. The selected server processes the request and returns the response to the client terminal 8 which issued the request.

It will be appreciated that at any particular time, a very large number of requests could be issued by clients globally to be received at the cloud 2 and managed by the load balancing mechanism 6. The servers 4 are agnostic, in the sense that they do not know anything about earlier requests that may have been received from the same client terminal and issued to other servers in the cloud 2. Each particular server manages the processing of the requests which it serves based on a queue of incoming requests to that server, managed by the load balancing mechanism 6.

An example of such an architecture is in a search engine, where a search request is received from the client terminal and directed to a server. The server processes the request by implementing the search and returning a search result to the user of the client terminal that issued the request.

SUMMARY

This summary is provided to introduce the selection of concepts in a simplified form that are further described below in the detailed description. This summary is not intended to identify key features or essential features of the claimed subject matter, nor is it intended to be used to limit the scope of the claimed subject matter.

A method of issuing requests from a user terminal is described herein. A first request for a service is issued to a server. A response to the first request is monitored to determine if it is received at the user terminal in a predetermined time. If a response has not been received in the predetermined time, a second, similar request is issued including distress information representing a degree of failure to process the first request, the distress information evaluated based on the monitoring step.

A user terminal is described for accessing a service from a server to which it is connected via a communication network. The user terminal has a transmit function operable to issue a first request to a server for the service. The user terminal also has a monitoring function which monitors whether a response to the first request is received at the terminal in a predetermined time. The transmit function issues a second, similar request for the same service if a response has not been received in a predetermined time. An insert function at the user terminal inserts in the second request distress information representing a degree of failure to process the first request, wherein the distress information is evaluated by the monitoring function.

A computer program product is described which has computer readable instructions on a computer readable medium which when executed by a computer provides a communication client for establishing communication events. The product also issues a first request to a server for a service required by the communication client, monitors whether a response to the first request is received at the user terminal in a predetermined time, and if a response has not been received in the predetermined time, issues a second, similar request and includes in the second request distress information representing a degree of failure to process the first request, the distress information evaluated based on the monitoring step.

The various embodiments can be applied in a wide variety of contexts. It can be used for browser applications, web clients and other clients. According to one example, a communication client which is operable to set up packet-based communications can benefit from the inventive concept.

For a better understanding of the various embodiments and to show how the same may be carried into effect reference will now be made by way of example to the accompanying drawings.

DETAILED DESCRIPTION

Various embodiments can improve the efficiency of processing requests particularly but not exclusively in a stateless server-based cloud architecture.

Various embodiments enable a client side application to signal distress or failure to receive services to a server side on consecutive requests. This enables the server side to prioritise requests and/or to fall back to provide a lower complexity or quality of service. This allows for a configurable quality/time-to-serve trade off which is important for near real-time applications. The principle can be applied to communication systems which enable web service API (Application Programming Interface) calls to be established. Stateless servers may maintain a list of alternative processes for Web service API calls. In one embodiment, the alternative processes may be prioritised based on computational requirements. In one embodiment, if the server load is high, lower computational requirement processes may be executed in response to a client call.

The server configuration may be a mapping of a call to alternate calls. Configurations can be set by the app developer. Configurations are synchronised to all other stateless servers in the group. Alternatively, the developer may set different configurations at each server.

When a client application makes a service request towards the cloud, it appends information about the last failed request. A stateless cloud server behind load balancing would normally know nothing about the failure of previous requests, but due to the "distress" information provided in the request it can prioritise the request in the queue, and also consider serving the request with a different, for example, computationally cheaper, algorithm.

Figure 2:
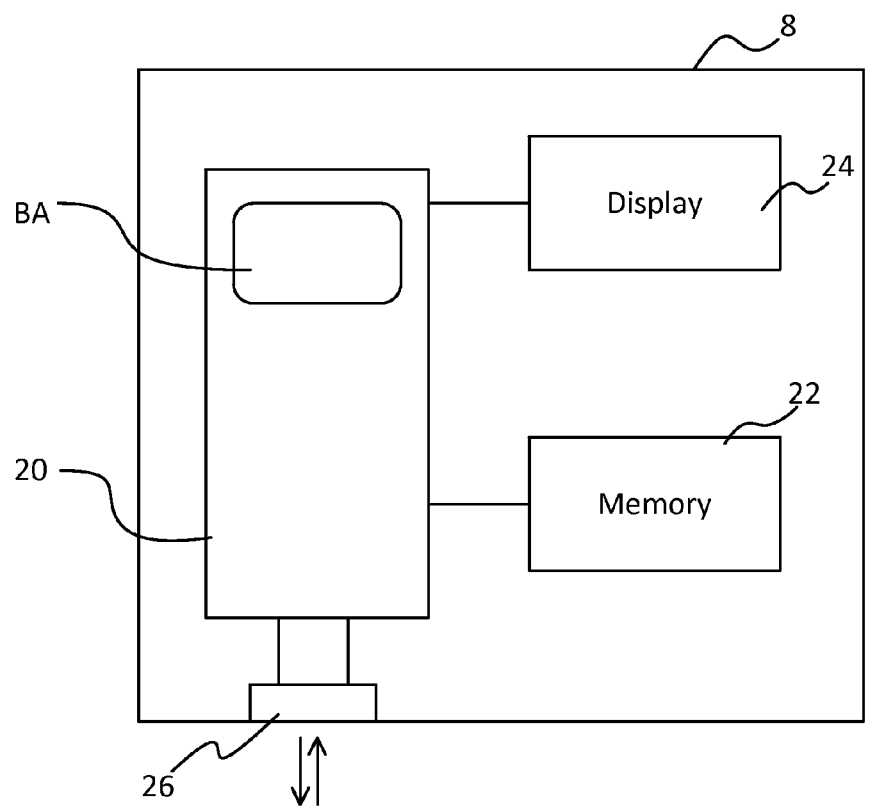
FIG. 2 is a schematic block diagram of components of an architecture of a client terminal in accordance with one or more embodiments.

Referring to FIG. 2, each client terminal 8 comprises a processor 20 which is connected to a memory 22 and a display 24. The processor 20 can execute code stored in memory 22. In particular, it can execute a client for accessing services via the Internet. The following description describes the case where the client is a browser application or web client. However, the various embodiments are not only intended for such contexts. According to another example, a communications client which is operable to set up packet-based communications over the Internet can benefit from the inventive concept. An example of such a communications client is that offered by Skype. The processor 20 is connected to a port 26 from which requests to the cloud 2 can be issued and responses to those requests can be received. As is well known in the field, the browser application can cause a user interface to be presented to the user on the display 24, by means of which the user can enter an Internet address to access the service required by the user. For example, it could be seeking content from a database.

The request to the cloud issued by the client can be issued responsive to the user request or without the user being specifically aware that a request has been issued. All the user knows is that he has asked for a particular service.

In accordance with embodiments of the present invention, the browser application (web client) is modified to append distress information about the last previous failed request(s) when the client makes a service request towards a cloud. This could either be the number of failed requests that have been submitted previously or the time in seconds since the first request, thus providing a gradient towards a perceived worsening of quality of service.

Figure 1:
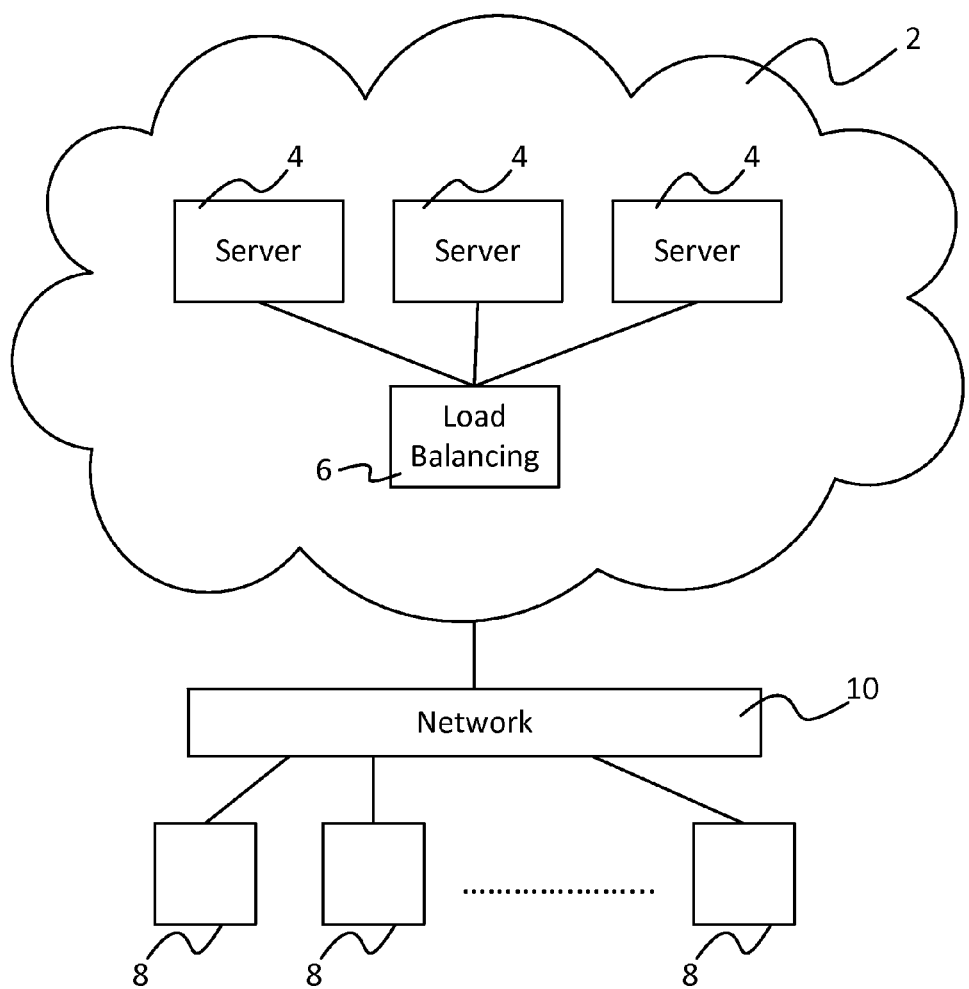
FIG. 1 is a schematic diagram of a stateless server cloud-based architecture.

A stateless cloud server behind a load balancing mechanism 6 (as in FIG. 1) normally knows nothing about the failure of previous requests, but with the modified client application described herein, distress information provided in the requests can allow the requests to be prioritised at the server. Additionally or alternatively, the server can consider serving the request with a different, e.g. computationally cheaper, algorithm when the distress information indicates that there has been a worsening quality of service. This mechanism can be used to reduce disruption in service to the client terminals by reducing the load on the server and by lowering the quality of services when the system is under stress.

Figure 3:
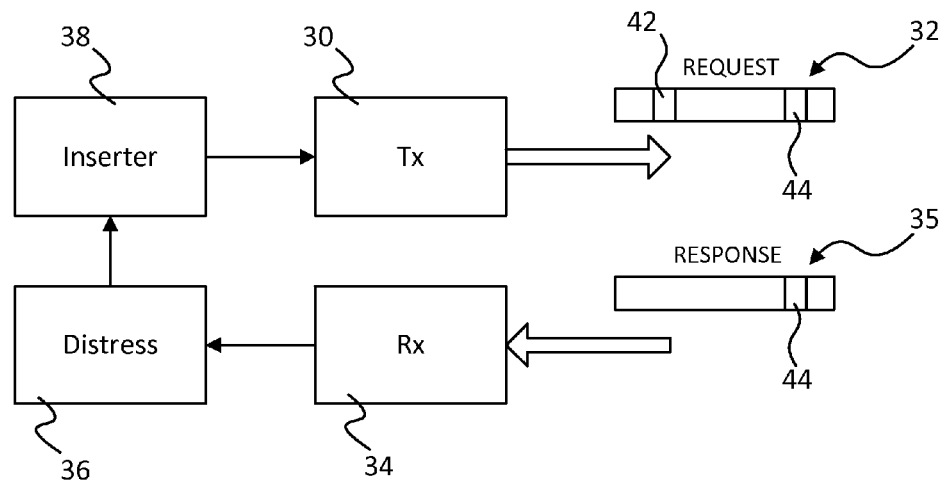
FIG. 3 is a functional block diagram of a browser application in accordance with one or more embodiments.

For the purposes of explanation, a schematic functional diagram of the modified client is shown in FIG. 3 in accordance with one or more embodiments. A transmit function 30 transmits requests 32 to the cloud 2. A receive function 34 receives responses 35 to that request. For example, this could be in the context of a web page serving user content from databases, with the client using AJAX to request content. As is well known, AJAX (Asynchronous Java Script and XML (Extended Markup Language)) provides a request object which can be used to retrieve data from a server. AJAX allows data to be exchanged between a user terminal and a server asynchronously, without interfering with the web page currently presented to the user. The receive function 34 monitors the time for receiving a response. If the response did not come in a designated time, a similar subsequent request is generated (effectively, the request is repeated) along with a modification to include distress information about the delay in receiving the service. The distress information is processed in the distress function 36 and inserted into the request by the insert function 38. The distress information is designated by reference numeral 42 in the request 32, and can take the form of a distress gradient.

It is possible to do an exponentially increasing wait on client side to help reduce the load on overloaded servers, that is to increase the time period before receiving a subsequent response and deciding that distress information is to be included in the next request. This could allow time for busy servers to respond based on the first distress information.

The association of responses with requests can be done in a variety of ways using known mechanisms. In one embodiment, a request is transmitted with a request identifier 44 which can be included in the returned response 35 so the client terminal can identify whether a response has been provided to a particular request.

Where the client is a communications client, the distress information can be used for responding to, for example, media relay requests by the client, that the user knows nothing about. The only visible gradient to the user in that context is just a long call setup time if relay requests fail. This can be improved by the client sending multiple requests with distress information.

The functionality at the server will now be described. Each server can be implemented as a separate server or a server instance. One of the server instances picks up requests from the server queue that are no older than a certain timeout period, after which the requests get dropped. Requests indicating a higher distress gradient (denoted by the value of the distress information 42 in the request) get picked up before the rest and the request is treated based on the distress gradient. That is, a particular algorithm or back-end process or database access can be selected based on the distress gradient.

For example a user could normally be presented with a webpage with high-quality results stemming from running a number of queries that together present a very informed picture about the user's expectations and how to best serve him or her. In the case of a request showing a high distress gradient (for example above a particular threshold), this could be replaced with a simple query that displays the latest results without modifying search terms to maximise personalisation.

In the context where the client is a communications client, and the requests are sent with distress information, the server responds by providing a less optimised selection of candidates for media relaying to set up a communication path. This allows a communication event (such as, for example, a voice over IP call) to be set up more quickly, even though possibly with a slightly lower call quality.

Figure 4:
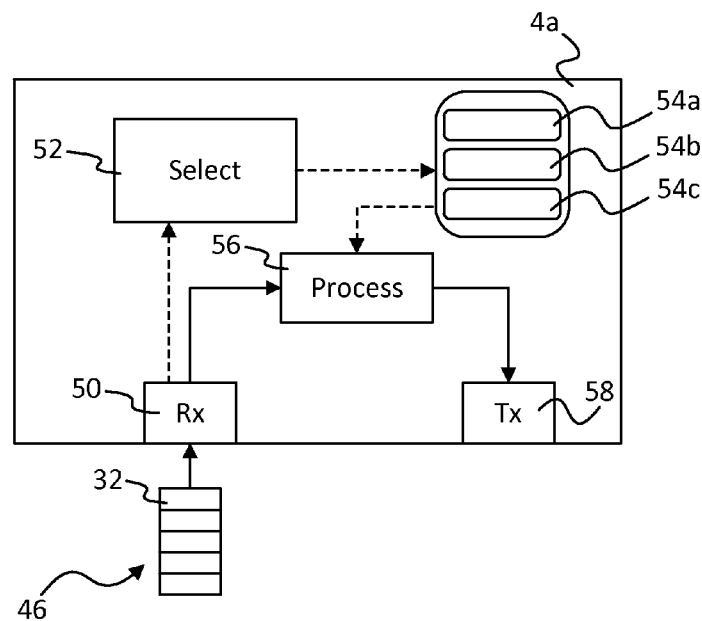
FIG. 4 is a functional block diagram of a server in accordance with one or more embodiments.

FIG. 4 shows the functionality at the server side, illustrating one particular server instance 4a in accordance with one or more embodiments. The server instance 4a has a receive function 50 which evaluates the distress gradients 42 of requests 32 in queue 46 and picks the most distressed request for processing. A select function 52 reads the distress gradient in the request and selects one of a number of functions 54a, 54b, 54c each of which can serve the request with a differing degree of complexity or quality. The selected function is passed to a process component 56 and then the request is served by the process component 56 using the selected function and the resulting response is generated by transmit function 58 for transmission to the requesting client terminal.

The distress information can be provided in any appropriate way, depending on the transport protocol, and is read at the application layer.

The described embodiments of the invention enable client-side applications to signal distress or failure to receive services from the server-side for consecutive requests, thereby enabling the server-side to prioritise requests and/or to fall back to provide lower complexity or lower quality services. This allows a configurable quality to time-to-serve trade-off to be implemented which can be important for near real-time applications.

According to one embodiment of the present invention there is provided a method of processing requests at a computer server, comprising: receiving a request for service from a user terminal, the request including distress information representing a degree of failure to process at least one prior similar request from the user terminal for the service; receiving the distress information from the request; and processing the request in accordance with the distress information.

In one or more embodiments, the step of processing the request comprises treating the request among a plurality of requests received at the server in an order based on the distress information.

In one or more embodiments, the step of processing the request comprises selecting from a set of alternative functions a function for handling the request based on the distress information.

In one or more embodiments, the selected function has a reduced complexity or cost compared with other functions in the set of alternative functions when the distress information is above a threshold level, indicating a high degree of failure to process previous similar requests.

In one embodiment, a plurality of requests to be processed by the server are placed in a queue, and wherein the server retrieves a request for processing from the queue based on the distress information in the request.

In one or more embodiments, requests which have been in the queue for a period exceeding a timeout period are discarded.

According to another embodiment of the present invention there is provided a server operable to process requests received at an input thereof, the server including: a receive component operable to receive a request identifying a user terminal, the request including distress information representing a degree of failure to process at least one other request from the user terminal, and to read the distress information from the request; and a processing component operable to process the request in accordance with the distress information.

In one embodiment, the server comprises a set of alternate functions for handling the request, the server comprising a select function for selecting one of a set of functions for handling the request based on the distress information in the request.

In another embodiment, the receive component of the server is operable to retrieve a request from a queue of requests and select the request for retrieval based on the distress information in the requests of the queue.

According to another embodiment of the present invention there is provided a method of issuing requests from a user terminal comprising: issuing a first request to a server for a service; monitoring whether a response to the first request is received at the user terminal in a predetermined time; if a response has not been received in the predetermined time, issuing a second, similar request and including in the second request distress information representing a degree of failure to process the first request, the distress information evaluated based on the monitoring step.

In one embodiment, the method comprises monitoring if a response to the second, or any subsequent, request is received in the predetermined time and if a response has not been received in the predetermined time, issuing a subsequent, or further subsequent, request including distress information representing the degree of failure to process the first and second and any previous subsequent request.

In another embodiment, the distress information comprises a number of prior requests issued for the same service from the user terminal to which no response has been received.

In a further embodiment, the distress information comprises the time elapsed since issuing of the first request.

According to another embodiment of the present invention there is provided a user terminal for accessing a service from a server to which it is connected via a communication network, the user terminal comprising: a transmit function operable to issue a first request to a server for the service; a monitoring function operable to monitor whether a response to the first request is received at the terminal in a predetermined time, wherein the transmit function is configured to issue a second, similar request for the same service if a response has not been received in a predetermined time; and an insert function operable to include in the second request distress information representing a degree of failure to process the first request, wherein the distress information is evaluated by the monitoring function.

According to another embodiment of the present invention there is provided a computer program product comprising computer readable instructions on a computer readable medium which when executed by a computer: issues a first request to a server of a service; monitors whether a response to the first request is received at the user terminal in a predetermined time; and if a response has not been received in the predetermined time, issues a second, similar request and includes in the second request distress information representing a degree of failure to process the first request, the distress information evaluated based on the monitoring step.

According to another embodiment of the present invention there is provided a computer program product comprising computer readable instructions on a computer readable medium which when executed by a computer: receives a request for service from a user terminal, the request including distress information representing a degree of failure to process at least one prior similar request from the user terminal for the service; receives the distress information from the request; and processes the request in accordance with the distress information.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
   one or more processors; and
   one or more memories comprising instructions stored thereon that, responsive to execution by the one or more processors, perform operations comprising:
   communicating, over a network, a first request to a server for a service;
   monitoring whether a response to the first request is received at the terminal within a predetermined period of time;
   if the response has not been received within the predetermined period of time, generating distress information representing a failure to process the first request and comprising at least one of a number of failed requests for the service communicated from the user terminal or a time since the first request for the service was communicated from the user terminal to the server;
   inserting the distress information with a second request for the same service;
   communicating, over the network, the second request for the same service and the distress information, the distress information configured to be read by the server to cause the server to process the second request in accordance with the distress information, the server configured to process the second request in accordance with the distress information by performing at least one of processing the second request using an algorithm that is computationally cheaper than the algorithm used to process the first request in order to reduce load on the server, or prioritizing the request ahead of one or more other requests based on the distress information; and
   monitoring if a response to the second request is received within the predetermined period of time and if a response has not been received within an additional predetermined period of time, issuing a subsequent request including additional distress information representing the failure to process the first and second request, the additional predetermined period of time greater than the predetermined period of time.

2. The user terminal according to claim 1, wherein the operations further comprise displaying a user interface configured to enable a user to initiate a request for the service.

3. The user terminal according to claim 2, wherein the operations further comprise displaying a response to the request to the user.

4. The user terminal according to claim 1, wherein the user terminal comprise one of a laptop, a tablet, a mobile phone and a personal computer.

5. The user terminal according to claim 1, wherein the instructions are constituted by program code in an executable application stored at the user terminal.

6. The user terminal according to claim 5, wherein the executable application comprises a communication client for establishing packet-based communication events from the user terminal.

7. The user terminal according to claim 6, wherein the request issued by the transmit function comprises a media relay request for implementing a communication event.

8. The user terminal according to claim 5, wherein the executable application comprises a search client.

9. The user terminal according to claim 5, wherein the executable application comprises a web browser.

10. A computer storage memory comprising computer readable instructions stored thereon that, responsive to execution by a computing device, perform operations comprising:
   issuing a first request to a server for a service required by a communication client;
   monitoring whether a response to the first request is received at the computing device within a predetermined period of time; and
   if the response has not been received within the predetermined period of time, generating distress information representing a failure to process the first request and comprising at least one of a number of prior failed requests for the same service communicated from the computing device or a time since the first request for the service was communicated from the computing device to the server;
   inserting the distress information with a second request for the same service;
   communicating, over the network, the second request for the same service and the distress information, the distress information configured to be read by the server to cause the server to process the second request in accordance with the distress information, the server configured to process the second request in accordance with the distress information by performing at least one of processing the second request using an algorithm that is computationally cheaper than the algorithm used to process the first request in order to reduce load on the server, or prioritizing the request ahead of one or more other requests based on the distress information; and monitoring if a response to the second request is received within the predetermined period of time and if a response has not been received within an additional predetermined period of time, issuing a subsequent request including additional distress information representing the failure to process the first and second request, the additional predetermined period of time greater than the predetermined period of time.

11. The computer storage memory according to claim 10, wherein the operations further comprise comprising displaying, on a display of the computing device, a user interface configured to enable a user to initiate a request for the service.

12. The computer storage memory according to claim 10, wherein the instructions correspond to program code of an executable application stored at the computing device, the executable application comprising one of a communication client for establishing packet-based communication events from the computing device, a search client, or a web browser.

13. A method implemented by a client device, the method comprising:
communicating, over a network, a first request to a server for a service;
monitoring whether a response to the first request is received at the client device within a predetermined period of time;
if the response has not been received within the predetermined period of time, generating distress information representing a failure to process the first request and comprising at least one of a number of failed requests for the service communicated from the client device or a time since the first request for the service was communicated from the client device to the server;
inserting the distress information with a second request for the same service;
communicating, over the network, the second request for the same service and the distress information, the distress information configured to be read by the server to cause the server to process the second request in accordance with the distress information, the server configured to process the second request in accordance with the distress information by performing at least one of processing the second request using an algorithm that is computationally cheaper than the algorithm used to process the first request in order to reduce load on the server, or prioritizing the request ahead of one or more other requests based on the distress information; and monitoring if a response to the second request is received within the predetermined period of time and if a response has not been received within an additional predetermined period of time, issuing a subsequent request including additional distress information representing the failure to process the first and second request, the additional predetermined period of time greater than the predetermined period of time.

14. The method according to claim 13, further comprising displaying, on a display of the client device, a user interface configured to enable a user to initiate a request for the service.

15. The method according to claim 13, further comprising displaying, on the display of the client device, a response to the request.

16. The method according to claim 13, wherein the client device comprise one of a laptop, a tablet, a mobile phone, or a personal computer.

17. The method according to claim 13, wherein the method is implemented by an executable application stored at the client device.

18. The method according to claim 17, wherein the executable application comprises a communication client for establishing packet-based communication events from the client device.

19. The method according to claim 17, wherein the executable application comprises a search client.

20. The method according to claim 17, wherein the executable application comprises a web browser.

* * * * *